(12) United States Patent
Sajassi

(10) Patent No.: US 10,432,515 B1
(45) Date of Patent: Oct. 1, 2019

(54) REDUCING NUMBER OF ETHERNET SEGMENT MPLS LABELS FOR ALL-ACTIVE MULTI-HOMING

(71) Applicant: Cisco Technology, Inc., San Jose, CA (US)

(72) Inventor: Ali Sajassi, San Ramon, CA (US)

(73) Assignee: Cisco Technology, Inc., San Jose, CA (US)

( * ) Notice: Subject to any disclaimer, the term of this patent is extended or adjusted under 35 U.S.C. 154(b) by 321 days.

(21) Appl. No.: 15/285,548

(22) Filed: Oct. 5, 2016

(51) Int. Cl.
*H04L 12/723* (2013.01)
*H04L 12/18* (2006.01)
*H04L 12/46* (2006.01)
*H04L 12/721* (2013.01)

(52) U.S. Cl.
CPC .......... H04L 45/507 (2013.01); H04L 12/184 (2013.01); H04L 12/1886 (2013.01); H04L 12/4633 (2013.01); H04L 12/4645 (2013.01); H04L 45/66 (2013.01)

(58) Field of Classification Search
CPC ............... H04L 45/745; H04L 41/0654; H04L 12/4641; H04L 45/50; H04L 41/0686; H04L 12/1886; H04L 45/08; H04L 45/02; H04L 45/66; H04L 61/6022; H04L 45/22; H04L 12/184; H04L 12/4633; H04L 49/201; H04L 49/351; H04N 21/6405
See application file for complete search history.

(56) References Cited

U.S. PATENT DOCUMENTS

| | | | |
|---|---|---|---|
| 8,531,941 B2 | 9/2013 | Sajassi et al. | |
| 8,953,590 B1 * | 2/2015 | Aggarwal | H04L 12/4675 370/389 |
| 9,391,885 B1 * | 7/2016 | Shukla | H04L 45/50 |
| 10,142,129 B1 * | 11/2018 | Gupta | H04L 12/4641 |
| 10,250,552 B1 * | 4/2019 | Sajassi | H04L 61/103 |

(Continued)

OTHER PUBLICATIONS

S. Mehta et al., titled "Design of a shared memory Carrier Ethernet switch compliant to Provider Backbone Bridging-Traffic Engineering (IEEE802.1Qay)," 2012 IEEE 13th International Conference on High Performance Switching and Routing, Belgrade, 2012, pp. 29-35. doi: 10.1109/HPSR.2012.6260824.*

(Continued)

*Primary Examiner* — Raj Jain
(74) *Attorney, Agent, or Firm* — Merchant & Gould P.C.

(57) ABSTRACT

First, a packet may be received by a first provider edge device from a first customer edge device locally connected to the first provider edge device. Then the first provider edge device may replicate the packet to a second customer edge device locally connected to the first provider edge device and encapsulate the packet with an address of the first provider edge device. Next, the first provider edge device may transmit the encapsulated packet to a second provider edge device. Then, the second provider edge device may determine from the determined address of the first provider edge device, that the first provider edge device is not locally connected to a third customer edge device. The second provider edge device may then replicate the packet to the third customer edge device in response to determining that the first provider edge device is not locally connected to the third customer edge device.

20 Claims, 5 Drawing Sheets

(56) References Cited

U.S. PATENT DOCUMENTS

| | | | | |
|---|---|---|---|---|
| 2012/0207058 A1* | 8/2012 | Shaw | .................. | H04L 12/4633 |
| | | | | 370/254 |
| 2014/0010232 A1* | 1/2014 | Sajassi | ................... | H04L 45/02 |
| | | | | 370/390 |
| 2014/0133354 A1* | 5/2014 | Scharf | .................... | H04L 45/42 |
| | | | | 370/254 |
| 2017/0093611 A1* | 3/2017 | Arora | .................. | H04L 41/0654 |
| 2017/0099180 A1* | 4/2017 | Singh | ................... | H04L 12/413 |
| 2017/0195210 A1* | 7/2017 | Jacob | .................. | H04L 12/4625 |
| 2017/0201389 A1* | 7/2017 | Tiruveedhula | ...... | H04L 12/1886 |
| 2017/0339052 A1* | 11/2017 | Arora | .................. | H04L 12/4641 |
| 2018/0183654 A1* | 6/2018 | Patel | .................. | H04L 41/0654 |

OTHER PUBLICATIONS

RFC 7432 (Feb. 2015) titled "BGP MPLS-Based Ethernet VPN" (7432 hereinafter) was released as Internet Engineering Task Force IETF); Request for Comments: 7432; Category: Standards Track; ISSN: 2070-1721, pp. 1-56.*

S. Bidkar et al., titled "A scalable framework for segment routing in service provider networks: The Omnipresent Ethernet approach," 2014 IEEE 15th International Conference on High Performance Switching and Routing (HPSR), Vancouver, BC, 2014, pp. 76-83.; doi: 10.1109/HPSR.2014.6900885.*

\* cited by examiner

REDUCING NUMBER OF ETHERNET SEGMENT MPLS LABELS FOR ALL-ACTIVE MULTI-HOMING

TECHNICAL FIELD

The present technology relates to network based services, and more specifically, to reducing the number of Ethernet Segment MPLS Labels for all-active multi-homing in Ethernet VPN (EVPN).

BACKGROUND

Multi-Protocol Label Switching (MPLS) is a type of data-carrying technique for high-performance telecommunications networks that directs data from one network node to the next based on short path labels rather than long network addresses, avoiding complex lookups in a routing table. The labels identify virtual links (paths) between distant nodes rather than endpoints. MPLS can encapsulate packets of various network protocols, hence its name "multiprotocol". MPLS supports a range of access technologies, including T1/E1, ATM, Frame Relay, and DSL.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
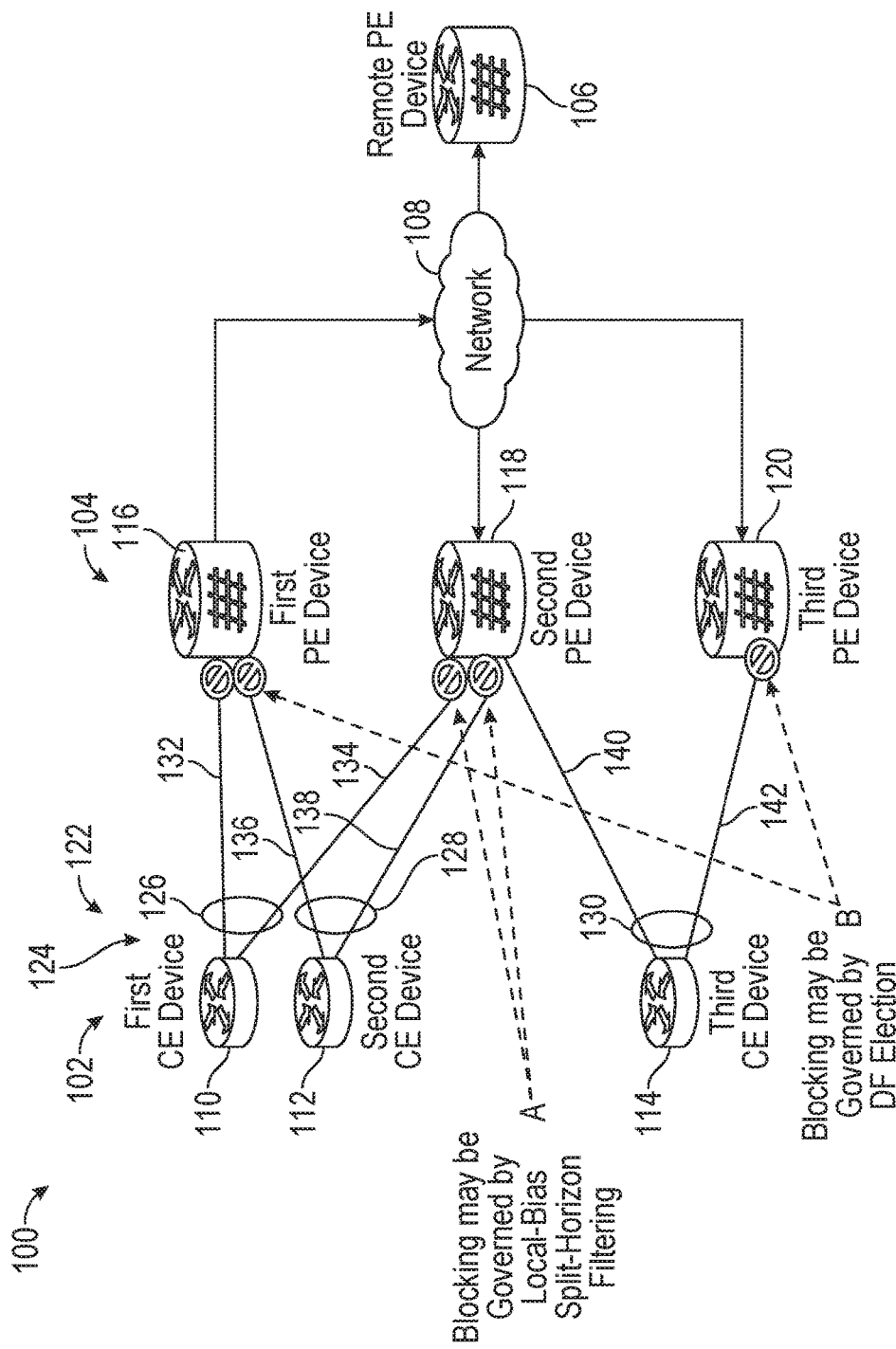
FIG. 1 is a block diagram of a service provider system.

IETF RFC 7432 defines Ethernet Virtual Private Network (EVPN) and its associated procedures for All-Active multi-homing. For All-Active multi-homing, it defines an MPLS label per Ethernet Segment Identifier (ESI) for the purpose of split-horizon filtering on that Ethernet Segment in order to prevent Broadcast, Unknown unicast, or Multicast (BUM) packets from getting loop back to their originating Ethernet Segment. Therefore, as many ESI MPLS labels (ESI labels) are required as there are Ethernet Segments on that Provider Edge (PE) device. This disclosure may provide a process to reduce the number of ESI labels significantly from N per PE (where N is the number of All-Active Ethernet Segments) to one per PE. This new MPLS label may be referred to as Originating PE (O-PE) label.

First, a BUM packet may be received by a first PE device from a first Customer Edge (CE) device locally connected to the first PE device. Then the first PE device may replicate the BUM packet to a second CE device locally connected to the first PE device and encapsulate the BUM packet with an MPLS label identifying the first PE device (O-PE label). Next, the first PE device may transmit the encapsulated packet to a second PE device. Then, the second PE device may determine from the O-PE label of the first PE device, that the first PE device is not locally connected to a third CE device. The second PE device may then replicate the packet to the third CE device in response to determining that the first PE device is not locally connected to the third CE device. The second PE device may not replicate the BUM packet to the second CE device because it may determine that the first PE device is locally connected to the second CE device.

Both the foregoing overview and the following example embodiment are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiment.

EXAMPLE EMBODIMENTS

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

A computer network can include a system of hardware, software, protocols, and transmission components that collectively allow separate devices to communicate, share data, and access resources, such as software applications. More specifically, a computer network may be a geographically distributed collection of nodes interconnected by communication links and segments for transporting data between endpoints, such as personal computers and workstations. Many types of networks may be available, ranging from local area networks (LANs) and wide area networks (WANs) to overlay and software-defined networks, such as virtual extensible local area networks (VXLANs), and virtual networks such as virtual LANs (VLANs) and virtual private networks (VPNs).

LANs may connect nodes over dedicated private communications links located in the same general physical location, such as a building or campus. WANs, on the other hand, may connect geographically dispersed nodes over long-distance communications links, such as common carrier telephone lines, optical lightpaths, synchronous optical networks (SONET), or synchronous digital hierarchy (SDH) links. LANs and WANs can include layer 2 (L2) and/or layer 3 (L3) networks and devices.

The Internet may be an example of a public WAN that connects disparate networks throughout the world, providing global communication between nodes on various networks. The nodes may communicate over the network by exchanging discrete frames or packets of data according to predefined protocols, such as the Transmission Control Protocol/Internet Protocol (TCP/IP). In this context, a protocol can refer to a set of rules defining how the nodes interact with each other. Computer networks may be further interconnected by intermediate network nodes, such as routers, switches, hubs, or access points (APs), which can extend the size or footprint of the network.

A service provider network can provide service to customer networks via Provider Edge (PE) devices (e.g., routers or switches) that may be located at the edge of the service provider network. Each PE device may be connected directly to a Customer Edge (CE) device (e.g., host, router or switch) located at the edge of a customer network. In other cases, an Access Network (AN) may provide connectivity (via Ethernet Virtual Circuits (EVC)) in order to interconnect PE and CE devices. In some instances, the AN can be an Ethernet Access Network (EAN) that can support EVCs by utilizing 802.1Q encapsulations. In other embodiments, the AN may be an IP or a MPLS network that may support EVCs by utilizing Ethernet over IP encapsulation or Ethernet over MPLS encapsulation, respectively. The PE devices in a service provider network may be connected by a Multi-Protocol Label Switching (MPLS) infrastructure that provides benefits such as fast-reroute and resiliency. The PE devices may also be connected by an IP infrastructure that utilizes Generic Routing Encapsulation (GRE) tunneling or other IP tunneling between the PE devices.

An Ethernet Virtual Private Network (EVPN) may be a layer 2 virtual private network (VPN) technology built over a Packet Switched Network (PSN) (e.g., utilizing an MPLS/IP infrastructure). An EVPN instance may include CE devices that may be connected to PE devices that may form the edge of the MPLS infrastructure. An EVPN instance can include one or more broadcast domains (e.g., one or more VLANs) that may be assigned to a given EVPN instance by the provider of the EVPN service. The PE devices provide virtual layer 2 bridged connectivity between the CE devices. A service provider network can include multiple EVPN instances. EVPN may provide advanced multi-homing capabilities and may use Border Gateway Protocol (BGP) to distribute customer MAC address information over the core MPLS network.

EVPN can provide a service provider network with solutions for multipoint Ethernet services utilizing MPLS/IP networks and advanced multi-homing capabilities. For example, EVPN may support single-homed devices, single-homed networks, multi-homed devices and multi-homed networks. A customer multi-homed device or a customer multi-homed network may tolerate certain network failures because the connection to two or more PE devices may provide additional redundancy. In all-active redundancy mode, all of the PEs attached to a customer multi-homed device/network may be allowed to forward known unicast traffic to/from that customer device or customer network. In single-active redundancy mode, only a single PE (the designated forwarder), among a group of PEs attached to a customer multi-homed device/network, may be allowed to forward any traffic to/from the customer device or customer network. In the event a failure occurs at the PE device that is the designated forwarder, a new designated forwarder can be elected in order to maintain network connectivity.

In the case where a CE device/network may be multi-homed to two or more PE devices, the set of Ethernet links between the CE device and the PE devices may constitute an Ethernet Segment (ES). In instances when an AN is used, a port (physical or logical (e.g., bundle)) on a PE device acts as a Network-to-Network Interface (NNI). In this context, NNIs may be used to aggregate and interconnect customers to a PE device by utilizing access Ethernet Virtual Circuits (EVCs). An External NNI (ENNI) may be used when the AN is built and operated by a third-party Service Provider. An Ethernet Segment that consists of EVCs instead of physical links may be referred to as a Virtual Ethernet Segment (vES).

The use of virtual Ethernet Segments may expand the capability of a single PE device. In the case of an ES, the PE may be limited to having a single CE device connected to each of its ports (i.e., there is a one-to-one relationship between a CE device and a physical/logical port (e.g., a bundle such as a 2×10GE bundle) on the PE. In the case of a vES, the PE device can be configured to provide service to thousands of customers over a common NNI that terminates access EVCs interconnecting thousands of CE devices).

FIG. 1 is a block diagram of a service provider system 100 including nodes/devices interconnected by various processes for communication. As shown in FIG. 1, service provider system 100 may comprise a plurality of CE devices 102, a plurality of PE devices 104, a remote PE 106, and a network 108. Network 108 may comprise, but is not limited to, a Multi-Protocol Label Switching (MPLS) network. Plurality of PE devices 104 may comprise an edge of network 108 that may face plurality of CE devices 102. Remote PE may be located in network 108.

Plurality of CE devices 102 may comprise a first CE device 110, a second CE device 112, and a third CE device 114. While FIG. 1 shows plurality of CE devices 102 comprising three CE devices, plurality of CE devices 102 is not limited to three devices and may comprise any number of CE devices. Plurality of PE devices 104 may comprise a first PE device 116, a second PE device 118, and a third PE device 120. While FIG. 1 shows plurality of PE devices 104 comprising three PE devices, plurality of PE devices 104 is not limited to three devices and may comprise any number of PE devices. Plurality of PE devices 104 may communicate with each other over network 108. Each one of plurality of CE devices 102 may comprise, but are not limited to, a host, a router, or a switch. Plurality of PE devices 104 may provide, for example, virtual Layer 2 bridged connectivity between plurality of CE devices 102.

Service provider system 100 may also comprise an Access Network (AN) 122 that may provide connectivity between plurality of CE devices 102 and plurality of PE devices 104. AN 122 may comprise, but is not limited to, an Ethernet Access Network (EAN), a MPLS network, or an IP network. Plurality of PE devices 104 and AN 122 may be built and/or operated by a single service provider. Plurality of PE devices 104 and AN 122 may be built and/or operated by separate entities or by separate divisions associated with a service provider. Consistent with embodiments of the disclosure, AN 122 may include additional network components.

Each of plurality of PE devices 104 in the service provider system 100 may comprise one or more ports that may be used to provide network connectivity to plurality of CE devices 102 via AN 122. The ports on any of plurality of PE devices 104 may comprise, but are not limited to, physical ports such as a 10GE interface or logical ports such as a 2×10GE bundle. For example, any of plurality of PE devices 104 may have one or more physical or logical ports such as Network-to-Network Interfaces (NNI) (not shown). AN 122 may comprise a plurality of segments 124 connecting plurality of CE devices 102 and plurality of PE devices 104. Plurality of segments 124 may comprise a first segment 126, a second segment 128, and a third segment 130. Each of plurality of segments 124 may comprise, but are not limited to, Ethernet Segments (ESs) (e.g., that may comprise Ethernet Virtual Circuits (EVCs) instead of physical links) that may be referred to as a Virtual Ethernet Segment (vES). vESs may include multiple EVCs.

As shown in FIG. 1, first segment 126 may comprise a first segment first link 132 and a first segment second link 134. Similarly, second segment 128 may comprise a second segment first link 136 and a second segment second link 138. And third segment 130 may comprise a third segment first link 140 and a third segment second link 142. First segment first link 132, first segment second link 134, second segment first link 136, second segment second link 138, third segment first link 140, and third segment second link 142 may each comprise, but are not limited to, an EVC.

As shown in FIG. 1, first CE device 110 may connect to first PE device 116 over first segment first link 132 and to second PE device 118 over first segment second link 134. Similarly, second CE device 112 may connect to first PE device 116 over second segment first link 136 and to second PE device 118 over second segment second link 138. And third CE device 114 may connect to second PE device 118 over third segment first link 140 and to third PE device 120 over third segment second link 142. Accordingly, first PE device 116 may be locally connected to both first CE device 110 and second CE device 112. Similarly, second PE device 118 may be locally connected to, first CE device 110, second CE device 112, and third CE device 114. And third PE device 120 may be locally connected to third CE device 114.

Service provider system 100 may provide multipoint Ethernet service by utilizing EVPN. EVPN PEs may signal and learn MAC addresses of each of plurality of CE devices 102 using Border Gateway Protocol. This may enable plurality of PE devices 104 to learn which ones of plurality of CE devices 102 are single-homed or multi-homed.

When any of plurality of CE devices 102 is multi-homed, (e.g., connected to more than one of plurality of PE devices 104), there may be two redundancy modes of operation. In all-active redundancy mode, all of plurality of PE devices 104 attached to a particular one of plurality of segments 124 may be allowed to forward known unicast traffic to/from that particular one of plurality of segments 124. In single-active redundancy mode, only a single one of plurality of PE devices 104 (e.g., the designated forwarder (DF)) may be allowed to forward traffic to/from a particular one of plurality of segments 124.

First CE device 110 may be a multi-homed device because it may be connected to first PE device 116 over first segment first link 132 and also to second PE device 118 over first segment second link 134. Similarly, second CE device 112 may be a multi-homed device because it may be connected to first PE device 116 over second segment first link 136 and also to second PE device 118 over second segment second link 138. And third CE device 114 may be a multi-homed device because it may be connected to second PE device 118 over third segment first link 140 and also to third PE device 120 over third segment second link 142. Accordingly, plurality of PE devices 104 may function together in either all-active redundancy mode or in single-active redundancy mode with respect to plurality of CE devices 102. As mentioned above, each plurality of PE devices 104 in service provider system 100 may advertise the MAC addresses and/or routes associated with each of its ports.

Embodiments of the disclosure may provide a virtual Ethernet Segment (vES) feature in EVPN. Accordingly, an Ethernet Segment, for example, may be represented by a collection of virtual links such as Pseudo Wires (PWs) or VLANs, as opposed to physical links for example. However, conventional EVPN may use a dedicated label (e.g. an MPLS label) per Ethernet Segment (either physical or virtual) which may be referred to as ESI label. In this conventional system, there can be hundreds of thousands of virtual Ethernet Segments per PE device, thus requiring the allocation of hundreds of thousands of ESI labels per PE device. The allocation of so many ESI labels per PE device and the distribution of them in BGP may be outside of the capabilities of white-box PE devices with low-cost ASICs. Embodiments of the disclosure may provide an environment where only a single label (e.g. MPLS label) may be advertised per PE device instead of hundreds or thousands of ESI labels.

Accordingly, embodiments of the disclosure may provide, for example, a the designated forwarder (DF) election process for All-Active multi-homing in EVPN, for example, in order to reduce the number of ESI labels from one per vES (e.g., which can be in hundreds of thousands) to only one per PE device. Consequently, embodiments of the disclosure may allow a single label (e.g. MPLS label) per PE device to be used for not only All-Active multi-homing scenarios, but also for Single-Active multi-homing with both physical and virtual Ethernet Segments.

Consistent with embodiments of the disclosure, when an originating PE device (i.e., that is multi-homed to a CE device) receives a packet (e.g., a broadcast, unknown destination address, multicast (BUM) frame) from a CE device, the originating PE device may prefer local replication to other locally attached CE devices (e.g., thus "local bias"). Also, the originating PE device may send the packet (e.g., BUM frame) to other receiving PE devices that may be members of the originating PE device's redundancy group over, for example, a MPLS/IP core. A receiving PE device in the redundancy group may check to see if it has any Ethernet Segments in common to the originating PE device. The receiving PE device may not forward the packet (e.g., BUM frame) to any Ethernet Segments that it has in common with the originating PE device.

Figure 2:
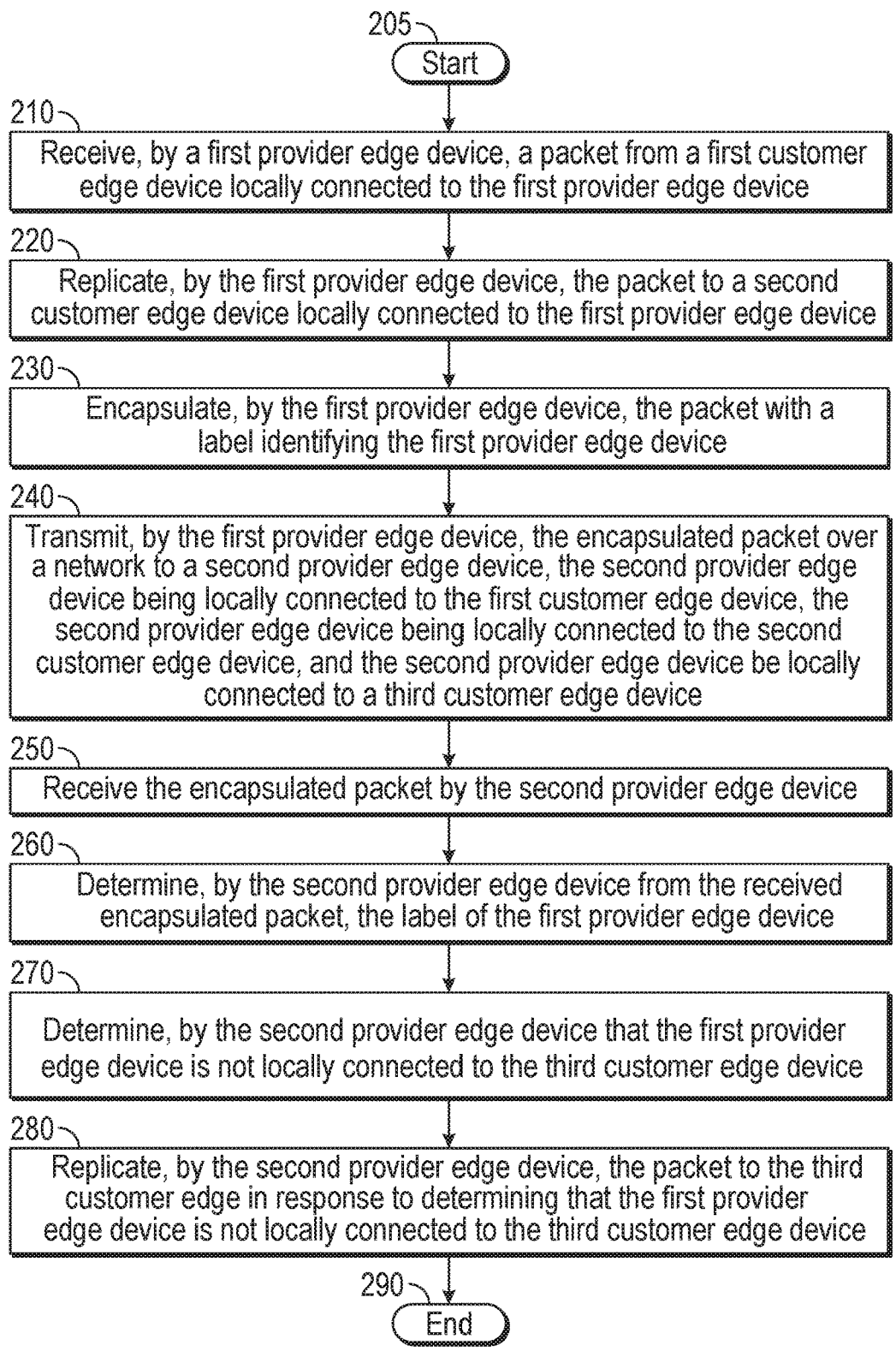
FIG. 2 is a flow chart of a method for reducing the number of addresses in a network.

FIG. 2 is a flow chart setting forth the general stages involved in a method 200 consistent with an embodiment of the disclosure for reducing the number of addresses in a network. Method 200 may be implemented using service provider system 100 as described in more detail above with respect to FIG. 1. Ways to implement the stages of method 200 will be described in greater detail below.

Method 200 may begin at starting block 205 and proceed to stage 210 where first PE device 116 may receive a packet from first CE device 110 locally connected to first PE device 116. For example, as shown in FIG. 1, first CE device 110, second CE device 112, and third CE device 114 may all be a part of the same VPN. Also first CE device 110 and second CE device 112 may be multi-homed to first PE device 116 and second PE device 118. Third CE device 114 maybe dual-homed to second PE device 118 and third PE device 120. First CE device 110 may send a pack comprising BUM traffic to first PE device 116.

From stage 210, where first PE device 116 receives the packet, method 200 may advance to stage 220 where first PE device 116 may replicate the packet to second CE device 112 locally connected to first PE device 116. For example, first PE device 116 may replicate the packet to second CE device 112 over its local attachment circuit (e.g., second segment first link 136.) First PE device 116 may prefer local replication and thus may have a "local bias".

Once first PE device 116 replicates the packet, method 200 may continue to stage 230 where first PE device 116 may encapsulate the packet with a label (e.g. MPLS label) identifying the first PE device 116. For example, first PE device 116 may encapsulate the packet comprising a BUM packet using EVPN encapsulation. The BUM packet may be encapsulated with the MPLS label identifying the first PE device 116. Each of plurality of PE devices 104 in the redundancy group may each correspondingly use a single MPLS label. This MPLS label may be used to identify a PE device in the redundancy group where the BUM packet originated. The outer MPLS label for the BUM packet indicates to a receiving PE device that this BUM packet may need to be replicated. In the above example, the encapsulated (e.g., EVPN) packet may be encapsulated with the source MPLS label corresponding to the first PE device 116 and outer MPLS label indicating a BUM traffic.

After first PE device 116 encapsulates the packet in stage 230, method 200 may proceed to stage 240 where first PE device 116 may transmit the encapsulated packet over network 108 to second PE device 118. Second PE device 118 may be locally connected to first CE device 110, second PE device 118 may be locally connected to second CE device 112, and second PE device 118 may be locally connected to third CE device 114. For example, first PE device 116 may send the encapsulated packet over network 108 comprising an MPLS core. As shown in FIG. 1, the encapsulated packet may be received by second PE device 118, third PE device, and remote PE device 106.

From stage 240, where first PE device 116 transmits the encapsulated packet over network 108, method 200 may advance to stage 250 where second PE device 118 may receive the encapsulated packet. For example, second PE device 118 may receive the encapsulated packet from network 108.

Once second PE device 118 receives the encapsulated packet, method 200 may continue to stage 260 where second PE device 118 may determine, from the received encapsulated packet, the MPLS label for the first PE device 116. For example, as stated above, the encapsulated (e.g., EVPN) packet may be encapsulated with the MPLS label corresponding to the first PE device 116 and an outer MPLS label corresponding to the BUM traffic. Second PE device 118 may parse the received encapsulated packet to determine from the received encapsulated packet that the originating PE may be the first PE device 116 from the O-PE MPLS label.

After second PE device 118 determines from the received encapsulated packet the identity of first PE device 116 in stage 260, method 200 may proceed to stage 270 where second PE device 118 may determine that first provider edge device 116 is not locally connected to third CE device 114. Because the received outer MPLS label may be identifying BUM traffic, second PE device 118 may know that the packet may need to be replicated. Now that second PE device 118 may know that the packet may need to be replicated, it may next determine where to replicate the packet. As shown in the FIG. 1 example, second PE device 118 may have three choices to which it may replicate the packet: first CE device 110; second CE device 112; and third CE device 114 because second PE device 118 may be locally connected to each.

Second PE device 118, upon determining the originating PE of the packet (e.g., the first PE device 116), may use this info to identify, from a replication list, all the interfaces associated with the Ethernet Segments that it has in common with the originating PE device. In this example, the PE device corresponding to the O-PE MPLS label may be first PE device 116. Accordingly, second PE device 118 may use the O-PE MPLS label of the packet (e.g., the MPLS label for the first PE device 116) to exclude all the interfaces associated with the Segments (e.g., first segment 126 and second segment 128) that it has in common with first PE device 116. In this example, the excluded (i.e., blocked) interfaces may correspond to first segment second link 134 and second segment second link 138. As shown in FIG. 1, these local bias blocks are indicated as "A" and may be considered to be governed by local bias split-horizon filtering.

From stage 270, where second PE device 118 determines that first PE device 116 is not locally connected to third CE device 114, method 200 may advance to stage 280 where second PE device 118 may replicate the packet to third CE device 114 in response to determining that first PE device 116 is not locally connected to third CE device 114. For example, second PE device 118 may know that it should replicate the packet because the packet has a received outer MPLS label that is for BUM traffic. Second PE device 118 may also know that first segment second link 134 and second segment second link 138 are blocked due to local bias, so it should not replicate to first CE 110 and second CE 112 even though it may be locally connected to them. Consequently, the only unblocked link may be third segment first link 140. Because second PE device 118 may have been elected the DF and because third segment first link 140 may be unblocked, second PE device 118 may replicate the packet to third CE device 114 over third segment first link 140.

Even though third PE device 120 may have received the packet too from first PE device 116 as described above, it may not replicate the packet to third CE 114 device because third segment second link 142 may be blocked because second PE device 118 may have been elected the DF and not third PE device 120. As shown in FIG. 1, these DF election blocks are indicated as "B" and may be considered to be governed by DF election. While first segment first link 132 and second segment first link 136 may also be blocked due to first PE device 116 also not being elected the DF, the block of second segment first link 136 was overridden due to the local bias preference described above. In other words, local bias rules may have priority over DF election rules. Once second provider edge device 118 replicates the packet to third customer edge device 114 in stage 280, method 200 may then end at stage 290.

Figure 3:
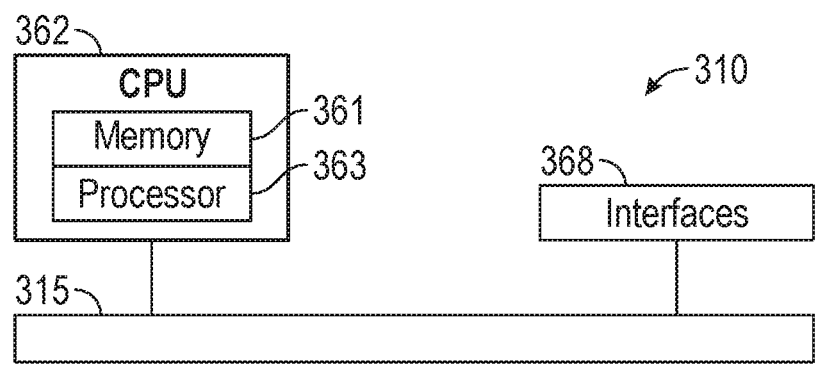
FIG. 3 is a block diagram of a network device.

FIG. 3 shows an example network device 310 that may comprise any one or more of plurality of CE devices 102 and any one or more of plurality of PE devices 104. A network device 310 may include a master central processing unit (CPU) 362, interfaces 368, and a bus 315 (e.g., a PCI bus). When acting under the control of appropriate software or firmware, CPU 362 may be responsible for executing packet management, error detection, and/or routing or forwarding functions. CPU 362 may accomplish all these functions under the control of software including an operating system and any appropriate applications software. CPU 362 may include one or more processors 363 such as a processor from any family of microprocessors. Consistent with embodiments of the disclosure, processor 363 may have hardware for controlling the operations of network device 310. A memory 361 (e.g., such as non-volatile RAM and/or ROM) may also form part of CPU 362.

Interfaces 368 may be provided as interface cards (e.g., "line cards"). They may control the sending and receiving of data packets over the network and sometimes support other peripherals used with network device 310. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. These interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow master microprocessor 362 to efficiently perform routing computations, network diagnostics, security functions, etc.

Although the system shown in FIG. 3 is one specific network device of the present disclosure, it is by no means the only network device architecture on which the present disclosure can be implemented. For example, an architecture having a single processor that handles communications as well as routing computations, etc., is often used. Further, other types of interfaces and media could also be used with the router.

Regardless of the network device's configuration, it may employ one or more memories or memory modules (including memory 361) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

Figure 4A:
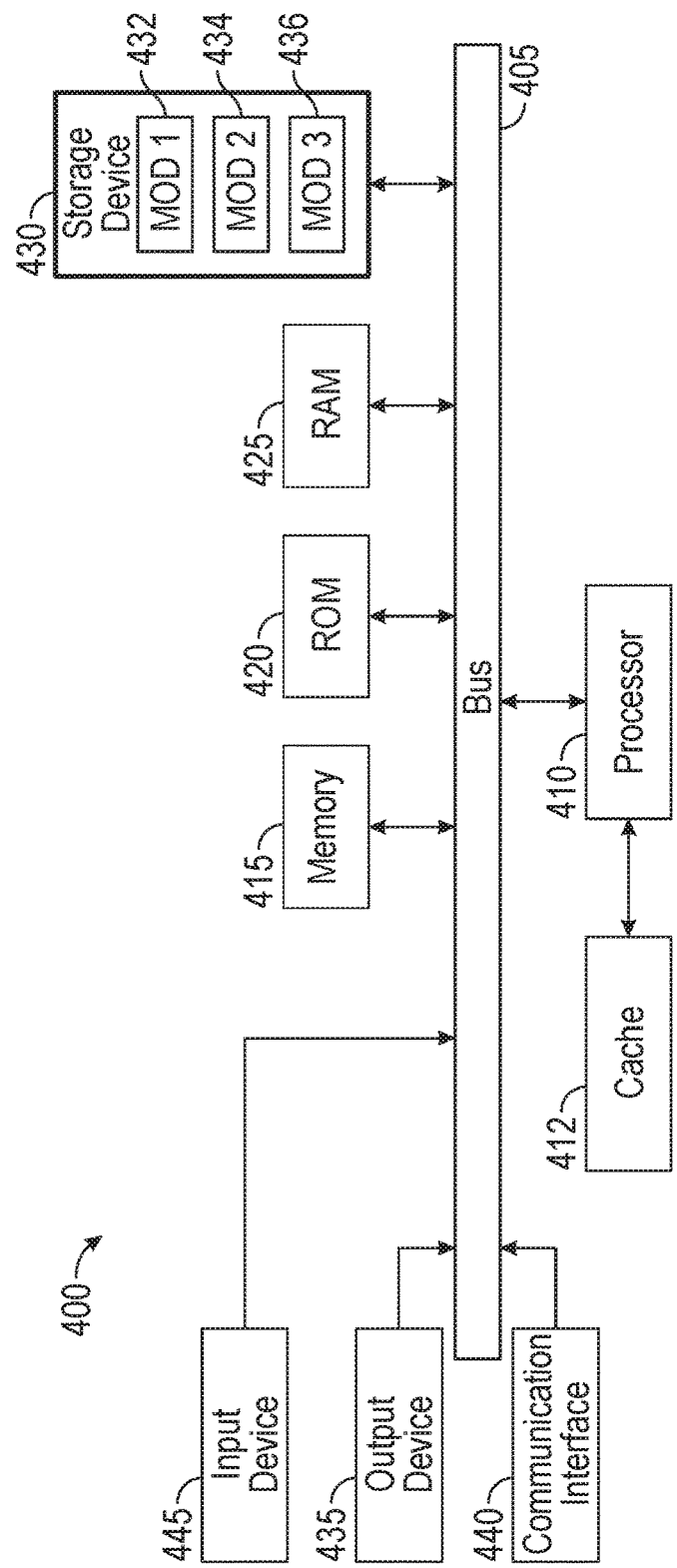
FIGS. 4A and 4B are block diagrams of a system.
Figure 4B:
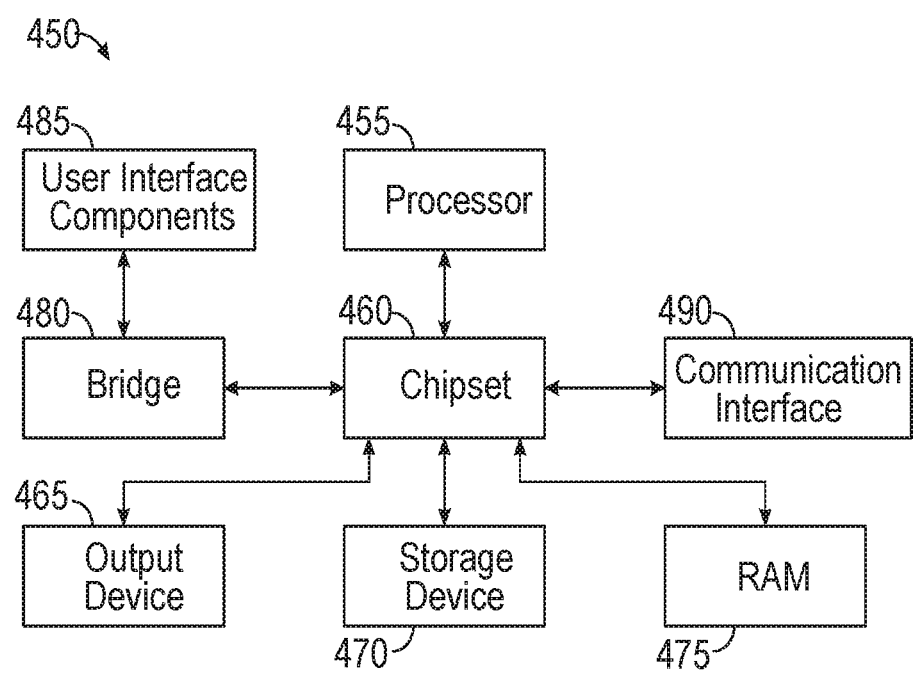

FIG. 4A and FIG. 4B illustrate example system embodiments. The more appropriate embodiment will be apparent to those of ordinary skill in the art when practicing the present technology. Persons of ordinary skill in the art will also readily appreciate that other system embodiments are possible.

FIG. 4A shows a system bus computing system architecture 400 wherein the components of the system are in electrical communication with each other using a bus 405. System bus computing system architecture 400 may comprise any one or more of plurality of CE devices 102 and any one or more of plurality of PE devices 104. System 400 may include a processing unit (CPU or processor) 410 and a system bus 405 that may couple various system components including system memory 415, such as a read only memory (ROM) 470 and a random access memory (RAM) 475, to processor 410. System 400 may include a cache of high-speed memory connected directly with, in close proximity to, or integrated as part of processor 410. System 400 may copy data from the memory 415 and/or storage device 430 to a cache 417 for access by processor 410. In this way, cache 417 may provide a performance boost that may avoid processor 410 delays while waiting for data. These and other modules may control or be configured to control processor 410 to perform various actions. Other system memory 415 may be available for use as well. Memory 415 may include multiple different types of memory with different performance characteristics. Processor 410 may include any general purpose processor and a hardware module or software module, such as a module 1 437, a module 7 434, and a module 3 436 stored in storage device 430, configured to control processor 410 as well as a special-purpose processor where software instructions are incorporated into the actual processor design. Processor 410 may be a completely self-contained computing system, containing multiple cores or processors, a bus, memory controller, cache, etc. A multi-core processor may be symmetric or asymmetric.

To enable user interaction with computing device 400, an input device 445 can represent any number of input mechanisms, such as a microphone for speech, a touch-sensitive screen for gesture or graphical input, keyboard, mouse, motion input, speech and so forth. An output device 435 can also be one or more of a number of output mechanisms. In some instances, multimodal systems may enable a user to provide multiple types of input to communicate with computing device 400. Communications interface 440 may generally govern and manage the user input and system output. There may be no restriction on operating on any particular hardware arrangement and therefore the basic features here may easily be substituted for improved hardware or firmware arrangements as they are developed.

Storage device 430 may be a non-volatile memory and can be a hard disk or other types of computer readable media which can store data that are accessible by a computer, such as magnetic cassettes, flash memory cards, solid state memory devices, digital versatile disks, cartridges, random access memories (RAMs) 475, read only memory (ROM) 470, and hybrids thereof.

Storage device 430 may include software modules 437, 434, 436 for controlling the processor 410. The storage device 430 can be connected to the system bus 405. In one aspect, a hardware module that performs a particular function can include the software component stored in a computer-readable medium in connection with the necessary hardware components, such as the processor 410, bus 405, display 435, and so forth, to carry out the function.

FIG. 4B shows an example computer system 450 that may comprise any one or more of plurality of CE devices 102 and any one or more of plurality of PE devices 104. Computer system 450 may have a chipset architecture that may be used in executing the described method 200 above. Computer system 450 may be an example of computer hardware, software, and firmware that can be used to implement the disclosed technology. System 450 may include a processor 455, representative of any number of physically and/or logically distinct resources capable of executing software, firmware, and hardware configured to perform identified computations. Processor 455 may communicate with a chipset 460 that may control input to and output from processor 455. In this example, chipset 460 may output information to output 465, such as a display, and may read and write information to storage device 470, which can include magnetic media, and solid state media, for example. Chipset 460 may also read data from and write data to RAM 475. A bridge 480 for interfacing with a variety of user interface components 485 may be provided for interfacing with chipset 460. Such user interface components 485 may include a keyboard, a microphone, touch detection and processing circuitry, a pointing device, such as a mouse, and so on. Inputs to system 450 may come from any of a variety of sources, machine generated and/or human generated.

Chipset 460 may also interface with one or more communication interfaces 490 that can have different physical interfaces. Such communication interfaces may include interfaces for wired and wireless local area networks, for broadband wireless networks, as well as personal area networks. Some processes for generating, displaying, and using the GUI may include receiving ordered datasets over a physical interface or may be generated by processor 455 analyzing data stored in storage 470 or 475. Further, the machine can receive inputs from a user via user interface components 485 and execute appropriate functions, such as browsing functions by interpreting these inputs using processor 455.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Moreover, the semantic data consistent with embodiments of the disclosure may be analyzed without being stored. In this case, in-line data mining techniques may be used as data traffic passes through, for example, a caching server or network router. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the components illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   receiving, by a first provider edge device, a packet from a first customer edge device locally connected to the first provider edge device;
   replicating, by the first provider edge device, the packet to a second customer edge device locally connected to the first provider edge device;
   encapsulating, by the first provider edge device, the packet with a label identifying the first provider edge device;
   transmitting, by the first provider edge device, the encapsulated packet over a network to a second provider edge device, the second provider edge device being locally connected to the first customer edge device, the second provider edge device being locally connected to the second customer edge device, and the second provider edge device being locally connected to a third customer edge device;
   receiving the encapsulated packet by the second provider edge device;
   determining, by the second provider edge device from the received encapsulated packet, the label identifying the first provider edge device;
   determining, by the second provider edge device from the determined label identifying the first provider edge device, that the first provider edge device is not locally connected to the third customer edge device, wherein determining that the first provider edge device is not locally connected to the third customer edge device comprises,
      determining from the determined label that the packet came from the first provider edge device,
      determining, from a replication list, all interfaces associated with Ethernet Segments that second provider edge has in common with the first provider edge device,
      blocking all interfaces determined to be in common with the first provider edge device, and
      determining that there is an interface between the second provider edge device and the third customer edge device that is not blocked; and
   replicating, by the second provider edge device, the packet to the third customer edge device over the interface between the second provider edge device and the third customer edge device that is not blocked in response to determining that the first provider edge device is not locally connected to the third customer edge device.

2. The method of claim 1, wherein transmitting the encapsulated packet over the network to the second provider edge device comprises transmitting the encapsulated packet over the network to the second provider edge device wherein the first provider edge device and the second provider edge device are members of a redundancy group.

3. The method of claim 2, further comprising electing the second provider edge device a designated forwarder (DF) for the redundancy group.

4. The method of claim 3, wherein replicating, by the first provider edge device, the packet to the second customer edge device, overrides a designated forwarding rule when the first provider edge device is not the designated forwarder (DF).

5. The method of claim 1, wherein receiving, by the first provider edge device, the packet comprises receiving the packet comprising a broadcast, unknown destination address, multicast (BUM) frame.

6. The method of claim 1, wherein encapsulating the packet with the label identifying the first provider edge device comprises encapsulating the packet with the label comprising an Multi-Protocol Label Switching (MPLS) label identifying the first provider edge device.

7. The method of claim 1, wherein transmitting the encapsulated packet over the network comprises transmitting the encapsulated packet over the network comprising a Multi-Protocol Label Switching (MPLS) network.

8. The method of claim 1, wherein encapsulating the packet further comprises encapsulating the packet with an outer MPLS label indicating broadcast, unknown unicast, and multicast traffic.

9. A system comprising:
a first provider edge device configured to,
receive a packet from a first customer edge device locally connected to the first provider edge device,
replicate the packet to a second customer edge device locally connected to the first provider edge device,
encapsulate the packet with a label identifying the first provider edge device, and
transmit the encapsulated packet over a network to a second provider edge device, the second provider edge device being locally connected to the first customer edge device, the second provider edge device being locally connected to the second customer edge device, and the second provider edge device being locally connected to a third customer edge device; and
a second provider edge device configured to,
receive the encapsulated packet,
determine, from the received encapsulated packet, the label identifying the first provider edge device,
determine, from the determined label of the first provider edge device, that the first provider edge device is not locally connected to the third customer edge device, wherein the second provider edge device configured to determine that the first provider edge device is not locally connected to the third customer edge device comprises the second provider edge device configured to,
determine from the determined label that the packet came from the first provider edge device,
determine, from a replication list, all interfaces associated with Ethernet Segments that second provider edge has in common with the first provider edge device,
block all interfaces determined to be in common with the first provider edge device, and
determine that there is an interface between the second provider edge device and the third customer edge device that is not blocked, and
replicate the packet to the third customer edge device over the interface between the second provider edge device and the third customer edge device that is not blocked in response to determining that the first provider edge device is not locally connected to the third customer edge device.

10. The system of claim 9, wherein the first provider edge device and the second provider edge device are members of a redundancy group.

11. The system of claim 10, wherein the second provider edge device is a designated forwarder (DF) for the redundancy group.

12. The system of claim 9, wherein the packet comprises a broadcast, unknown destination address, multicast (BUM) frame.

13. The system of claim 9, wherein the label comprises a Multi-Protocol Label Switching (MPLS) label.

14. The system of claim 9, wherein the network comprises a Multi-Protocol Label Switching (MPLS) network.

15. The system of claim 9, wherein the first provider edge device being configured to encapsulate the packet further comprises the first provider edge device being configured to encapsulate the packet with an outer MPLS label designated to multicast (BUM) traffic.

16. A method comprising:
receiving, by a first provider edge device, a packet from a first customer edge device locally connected to the first provider edge device wherein the packet comprises a broadcast, unknown destination address, multicast (BUM) frame;
replicating, by the first provider edge device, the packet to a second customer edge device locally connected to the first provider edge device;
encapsulating, by the first provider edge device, the packet with a label identifying the first provider edge device wherein encapsulating the packet further with an outer label designated for multicast (BUM) traffic;
transmitting, by the first provider edge device, the encapsulated packet over a network to a second provider edge device, the second provider edge device being locally connected to the first customer edge device, the second provider edge device being locally connected to the second customer edge device, and the second provider edge device being locally connected to a third customer edge device, wherein the first provider edge device and the second provider edge device are members of a redundancy group and the second provider edge device is a designated forwarder (DF) for the redundancy group, wherein the network comprising a Multi-Protocol Label Switching (MPLS) network;
receiving the encapsulated packet by the second provider edge device;
determining, by the second provider edge device from the received encapsulated packet, the label identifying the first provider edge device;
determining, by the second provider edge device from the determined label of the first provider edge device, that the first provider edge device is not locally connected to the third customer edge device, wherein determining that the first provider edge device is not locally connected to the third customer edge device comprises,
- determining from the determined label that the packet came from the first provider edge device,
- determining, from a replication list, all interfaces associated with Ethernet Segments that second provider edge has in common with the first provider edge device,
- blocking all interfaces determined to be in common with the first provider edge device, and
- determining that there is an interface between the second provider edge device and the third customer edge device that is not blocked; and replicating, by the second provider edge device, the packet to the third customer edge device over the interface between the second provider edge device and the third customer edge device that is not blocked in response to determining that the first provider edge device is not locally connected to the third customer edge device.

17. The method of claim 16, wherein replicating, by the first provider edge device, the packet to the second customer edge device, overrides a designated forwarding rule when the first provider edge device is not the designated forwarder (DF).

18. The method of claim 16, wherein encapsulating the packet with the label identifying the first provider edge device comprises encapsulating the packet with the label comprising an Multi-Protocol Label Switching (MPLS) label identifying the first provider edge device.

19. The method of claim 16, wherein encapsulating the packet with the label identifying the first provider edge device comprises encapsulating the packet with the label that can be downstream assigned.

20. The method of claim 16, wherein encapsulating the packet with the label identifying the first provider edge device comprises encapsulating the packet with the label that can be upstream assigned.

* * * * *